United States Patent [19]
Pearl

[11] 3,772,955
[45] Nov. 20, 1973

[54] STIFFENED CUTTING BLADE WITH REPLACEABLE EDGE MEMBER

[75] Inventor: David R. Pearl, West Hartford, Conn.

[73] Assignee: Garber Garment Technology, Inc., East Hartford, Conn.

[22] Filed: Sept. 23, 1971

[21] Appl. No.: 183,004

[52] U.S. Cl.................. 83/746, 30/349, 83/635, 83/925 CC
[51] Int. Cl............................................. B26d 1/10
[58] Field of Search.............. 83/698, 697, 925 CC, 83/635, 746; 143/133 A, 68 E; 30/346.58, 346.59, 346.6, 349, 273

[56] References Cited
UNITED STATES PATENTS

| 929,059 | 7/1909 | Weck | 30/346.58 |
|---|---|---|---|
| 1,124,690 | 1/1915 | Barnett | 30/349 |
| 1,917,889 | 7/1933 | Jacques | 30/273 |
| 2,053,358 | 9/1936 | Woodward | 83/697 |
| 2,580,146 | 12/1951 | Williams | 83/697 |
| 2,584,603 | 2/1952 | McMillan et al. | 30/349 |
| 3,347,125 | 10/1967 | Shields | 30/273 X |
| 3,349,488 | 10/1967 | Craig | 30/346.6 |
| 3,541,910 | 11/1970 | Murray | 83/698 X |

Primary Examiner—Andrew R. Juhasz
Assistant Examiner—Horace M. Culver
Attorney—Donald K. Huber

[57] ABSTRACT

An elongated cutting blade for use in a cutting apparatus for cutting layups of fabric or other similar sheet material is adapted to be held at one end, in a cantilevered fashion, and reciprocated along its longitudinal axis when actively cutting. The blade is a composite part made up of an easily sharpenable edge member, which provides the cutting edge, and a stiffening rib extending along the rear edge of the edge member and serving to reduce lateral and rearward deflection. The rib is preferably made of tungsten carbide and is joined to the edge member by a means which allows the edge member to be removed therefrom and replaced by a new edge member after the edge member has been sharpened or worn beyond a desirable point.

6 Claims, 14 Drawing Figures

STIFFENED CUTTING BLADE WITH REPLACEABLE EDGE MEMBER

BACKGROUND OF THE INVENTION

This invention relates to cutting blades for use in a cutting apparatus of the type employing an elongated cantilevered cutting blade and used for cutting layups of sheet material and the like, and deals more particularly with such a cutting blade which is of an improved construction so as to render it readily sharpenable and yet relatively stiff so as to be less subject to producing cutting errors arising from lateral or rearward deflection of the lower unsupported end of the blade.

One type of cutting apparatus presently used for cutting garment and upholstery fabric and similar sheet materials, as shown for example by U.S. Pat. No. 3,548,697, uses an elongated cutting blade which is part of a cutter moved over the top of a layup of sheet material to cause the cutting blade to follow a desired line of cut, the cutting blade being attached at its upper end to the remainder of the cutter and extending downwardly therefrom in cantilevered fashion through the layup of sheet material and being reciprocated vertically along its longitudinal axis while actively cutting. In such an apparatus, some means, such as a penetrable supporting bed is provided to allow the lower end of the blade to extend downwardly beyond the lower surface of the layup during at least a portion of each of its strokes. In view of the fact that the blade is cantilevered, forces which are imposed on the lower end portion of the blade by the material being cut, and which are usually laterally or rearwardly directed, tend to deflect the lower end of the blade away from its desired position and, especially when the layup is relatively thick, unacceptable cutting errors may be produced by such deflection with the result that a piece cut from an upper layer of the layup will not exactly match a piece cut from a bottom layer.

To reduce the deflection of the blade, it may be made from a very stiff material such as tungsten carbide. This has the problem, however, that tungsten carbide is difficult to sharpen and even after sharpening produces an edge which is usually not of the best character for cutting the material in question. That is, sharpened edges formed on tungsten carbide members are relatively dull compared to the edges which may be produced on members made of some other materials. The preferred material for producing a cutting edge is steel, but steel has a relatively low modulus of elasticity so that a blade made entirely of steel will usually deflect an undesirable amount unless it is made of an undesirably large cross section.

The object of the present invention is, therefore, to provide a cutting blade for use in a cutting apparatus of the type employing an elongated cantilevered cutting blade reciprocated along its longitudinal axis and which cutting blade is both stiff to reduce deflection of its unsupported end and readily sharpenable to provide a cutting edge of a desirable sharp character. In keeping with this object a further object is to provide a cutting blade of the foregoing character which is made of an edge member made of a sharpenable material and a stiffening rib made of a relatively stiff material, the edge member being releasable from the rib to allow its replacement after it has been sharpened or worn beyond a desirable point.

SUMMARY OF THE INVENTION

This invention relates to a stiffened cutting blade for use in a cutting apparatus used for cutting layups of fabric or other sheet material and of the type which employs an elongated cantilevered cutting blade reciprocated along its longitudinal axis when actively cutting. The blade is a composite part including an elongated edge member having two generally parallel side faces, a longitudinally extending rear edge and a longitudinally extending front edge sharpened along at least a portion of its length. A stiffening rib is attached to the edge member and has two side cheeks each of which engage a respective one of the side faces of the edge member and each of which has a longitudinally extending front edge located a substantial distance rearwardly of the front edge of the edge member so that the edge member projects a substantial distance forwardly beyond the rib to allow the sharp edge of the edge member to be sharpened without the sharpener engaging or being interferred with by the rib. The rib is made of a material, preferably tungsten carbide, substantially stiffer than the material of the edge member, and the edge member is made of a material, preferably steel, substantially more sharpenable than the material of the rib. Additionally, the rib is attached to the edge member by a means which allows the edge member to be releasably removed from the rib. The means for releasably fixing the edge member to the rib may alternatively comprise a bonding agent having heat destructible bonding properties or a mechanical interfit between the edge member and the rib allowing the two to be assembled and disassembled from one another by a snap action arising from the flexibility of the edge member.

DESCRIPTION OF THE PREFERRED EMBODIMENTS

Figure 1:
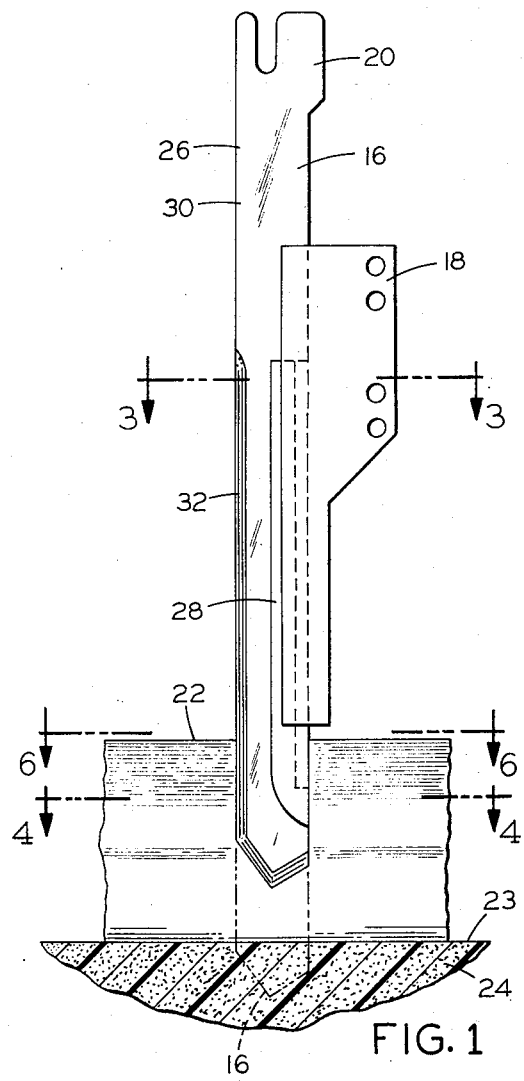
FIG. 1 is a side elevational view of a blade embodying this invention, the solid lines showing the blade in the upper extent of its reciprocating movement and the broken lines showing the blade in the lower extent of its reciprocating movement, this figure also showing a holder for the upper portion of the blade.

Turning first to FIG. 1, a stiffened blade embodying this invention is there indicated at 16 and is shown in combination with a holder or guide 18. The blade 16 is of an elongated shape, and at its upper end 20 is adapted to be connected to the chuck of a cutter, not shown, which reciprocates the blade vertically along its longitudinal axis, or vertically in FIG. 1, relative to the holder 18.

In FIG. 1 a layup of sheet material to be cut by the knife 16 is indicated at 22 and is supported on the upper surface 23 of a bed 24 of penetrable material. The solid lines show the blade 16 in the upper limit of its stroke when in cutting relationship with the layup 22 and the broken lines show the blade in the lower extent of its stroke. From this it will be noted that during at least a portion of the stroke the lower end of the blade penetrates and extends downwardly beyond the supporting surface 23 of the bed 24.

The holder 18 is fixed to the body of the cutter head for movement with the blade 16 along the line of cut, but during a cutting operation does not move vertically, its lower end normally being positioned a short distance above the top of the layup 22. From the position shown in FIG. 1 both the blade 16 and the holder 18 may be raised relative to the layup 22 to a position at which the blade is entirely out of cutting relationship with the layup. That is, at such a raised position the lower end of the blade 16 in the lowermost extent of its stroke is located above the layup so that the blade may be moved to a new point on the layup to start a new cut without cutting the layup during its movement to the new position.

The holder 18 is a relatively thick stiff member which engages the sides and rear edge of the blade 16 immediately above the layup 22 and prevents it from deflecting laterally and rearwardly along that portion of the blade engaged by it. Below the lower end of the holder, however, the blade is unsupported and is subject to both lateral and rearward deflections by the forces imposed thereon by the layup as it is moved through the layup. These deflections increase as the thickness of the layup increases, that is as the length of the unsupported portion of the blade required to cut the layup is increased, and directly depend on the inherent stiffness of the blade itself.

The blade 16, to render it relatively stiff to minimize deflection of its lower end while nevertheless allowing it to be provided with a good quality sharpenable cutting edge is made as a composite part. More particularly, referring to FIGS. 1 to 6, the blade 16 comprises an edge member 26 and a stiffening rib 28. The edge member 26 has two side faces 30, 30 generally parallel to one another, a front edge 32, and a rear edge 34. The front edge 32 is sharpened along a major portion of its length as shown, and the bottom of the edge member also includes two sharpened edges 36 and 38 which intersect to form a downwardly directed point.

Figure 2:
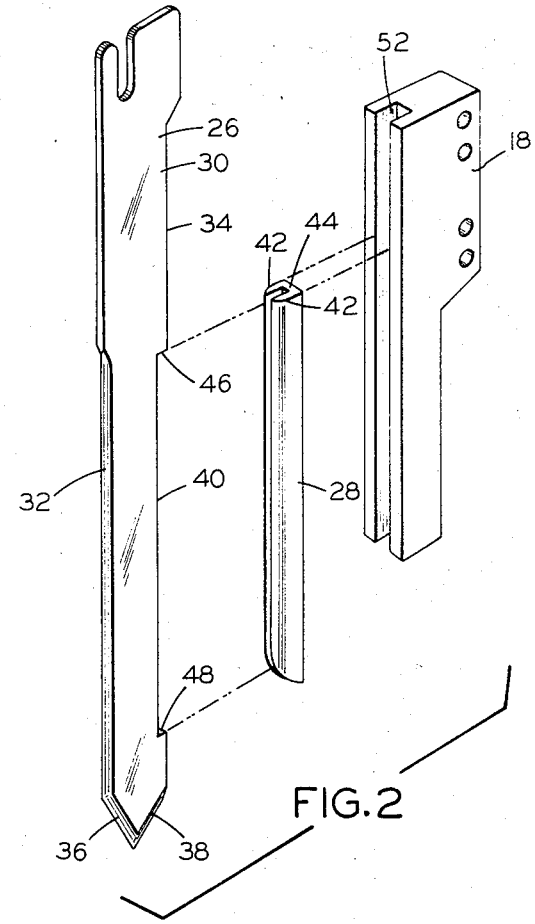
FIG. 2 is a perspective exploded view of the blade and holder of FIG. 1.
Figure 3:
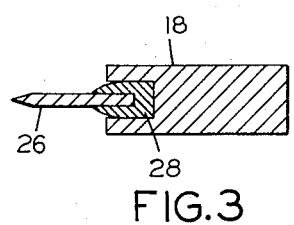
FIG. 3 is a transverse sectional view, drawn on a scale slightly enlarged from that of FIG. 1, taken on the line 3—3 of FIG. 1.
Figures 4, 5:
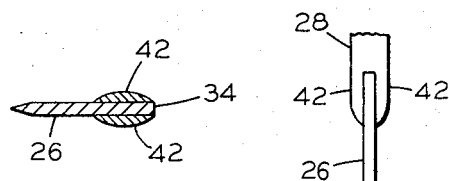
FIG. 4 is a transverse sectional view, drawn on a scale slightly enlarged from that of FIG. 1, taken on the line 4—4 of FIG. 1.
FIG. 5 is a rear elevational view of the lower end portion of the blade of FIG. 1, this view being drawn on a slightly enlarged scale from that of FIG. 1.

Along the rear edge 34 of the edge member 26 is a forwardly relieved portion 40 which receives the rib 28, as shown best in FIG. 2. Also as shown best in FIG. 2 the rib 28 includes two cheeks 42, 42 which engage the respective side faces 30, 30 of the edge member and a spine portion 44 which is located rearwardly of the rear edge of the edge member and which connects the two cheeks 42, 42 to one another. The cheeks 42, 42 have forward edges which are located a substantial distance rearwardly of the front edge 32 of the edge member so that the edge member projects a substantial distance forwardly beyond the rib 28. This allows the sharpened edge portion of the blade to be engaged by a conventional sharpener as may be carried by the cutter without the rib interfering with or engaging the sharpener. Also, the cheeks 42, 42 are feathered so as to smoothly blend with the side faces 30, 30 of the edge member to allow the rib to move as smoothly as possible through the material being cut.

The relieved portion 40 of the rear edge 34 of the edge member is defined by an upper shoulder 46 and a lower shoulder 48, and the spine portion 44 of the rib 28 is of such a length as to fit snugly between the two shoulders 46 and 48. The two cheeks, 42, 42 of the rib, however, extend downwardly below the shoulder 48, as shown best in FIGS. 4 and 5, and terminate rearwardly in line with the rear edge 34 of the edge member. The spine portion 44 of the rib 28 in turn has a rear edge which is aligned with the rear edge of the edge member 16 below the notch 48 and above the notch 46 so that the edge member 16 and rib 28 in the composite blade 16 define a continuous straight rear edge for the blade.

The holder 18, as shown best in FIG. 2, includes a forwardly opening notch 52 extending along the length thereof which slidably receives the rib 28 so as to restrain it against rearward and lateral deflection.

Figure 6:
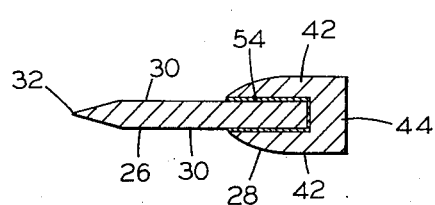
FIG. 6 is a still further enlarged cross-sectional view taken on the lines 6—6 of FIG. 1, the thickness of the bonding agent being exaggerated for purposes of clarity.
Figure 7:
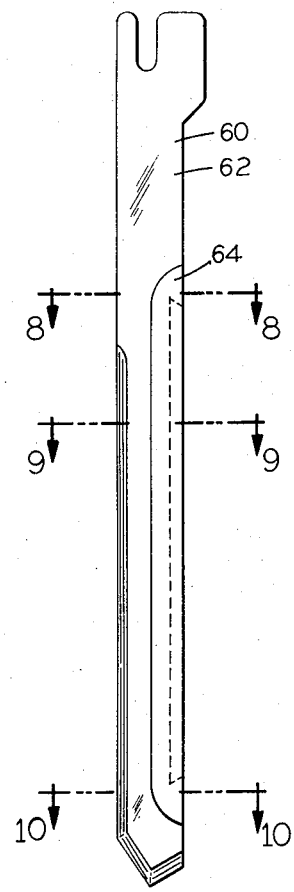
FIG. 7 is a side elevational view of a blade comprising another embodiment of this invention.

The edge member 26 is made of a material, such as steel, which is readily sharpenable to produce a good quality sharp cutting edge. The rib 28 in turn is made of a material having a high degree of stiffness, that is a high modulus of elasticity. Preferably, the material of the rib is tungsten carbide. Ribs made of this material are, however, relatively expensive and therefore the blade 16 further preferably includes a means for fixing the rib to the edge member in such a way that the edge member may subsequently be released from the rib member to allow it to be replaced by a new edge member, thereby salvaging the rib for subsequent reuse. The means for releasably fixing the rib to the edge member may take various different forms and may, for example, consist of a bonding agent interposed between the rib and the edge member which bonds the rib to the edge member and whose bonding power is destroyed in the presence of an elevated temperature greater than that normally encountered during a cutting operation, so that the edge member may be released from the rib by exposing the blade to such an elevated temperature. Such a bonding agent is shown in FIG. 6 at 54 and preferably, when the edge member is made of steel and the rib member is made of tungsten carbide, constitutes silver solder.

FIGS. 7 to 13 illustrate another stiffened blade embodying this invention and which is generally similar to that of FIGS. 1 to 6 except with regard to the means for releasably fixing the rib to the edge member, the blade of FIGS. 7 to 14 being one wherein the rib is joined to the edge member by a simple mechanical interlock providing a snap action fit between the rib and the edge member whereby the rib may be assembled and disassembled from the edge member by merely bending the edge member.

Figure 11:
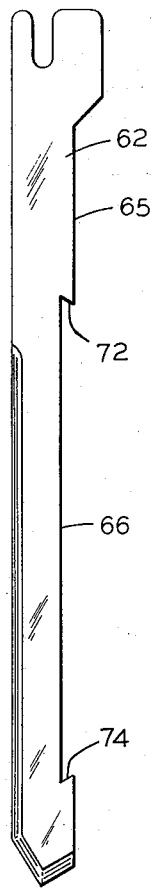
FIG. 11 is a side elevational view of the edge member of the blade of FIG. 7.
Figure 12:
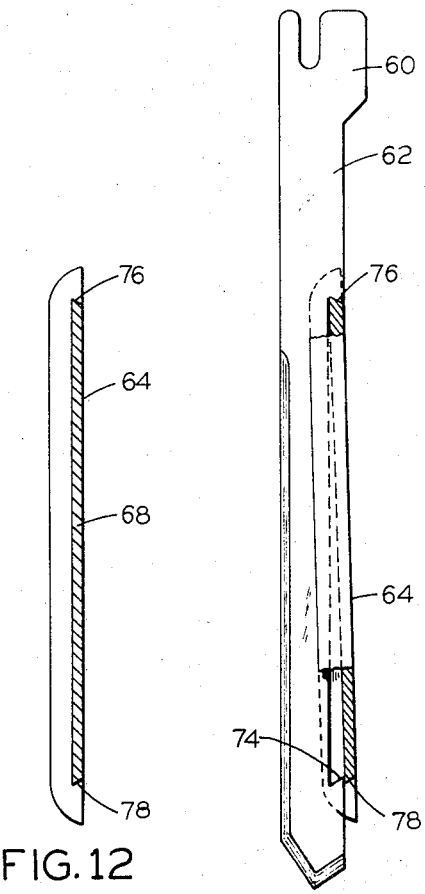
FIG. 12 is a longitudinal sectional view taken on the line 12—12 of FIG. 9 of the rib of the blade of FIG. 7.
Figure 13:
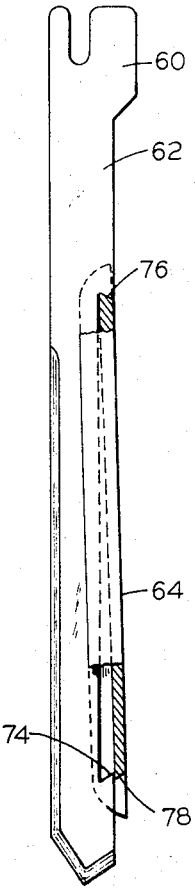
FIG. 13 is an elevational view showing the rib of the blade of FIG. 7 partially disassembled from the edge member of the blade of FIG. 7, the top and bottom portions of the rib being shown partly broken away.
Figure 8:
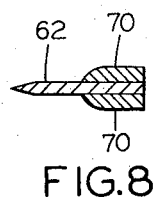
FIG. 8 is a transverse sectional view, on a scale slightly enlarged from that of FIG. 7, taken on the lines 8—8 of FIG. 7.
Figure 9:
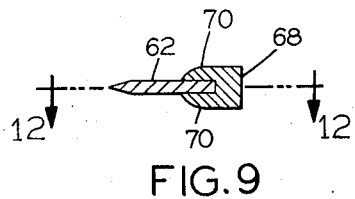
FIG. 9 is a transverse sectional view, on a scale slightly enlarged from that of FIG. 7, taken on the line 9—9 of FIG. 7.
Figure 10:
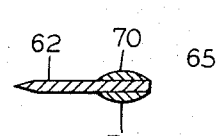
FIG. 10 is a transverse sectional view, on a scale slightly enlarged from that of FIG. 7, taken on the line 10—10 of FIG. 7.

Referring to FIGS. 7 to 13, the blade there shown is indicated at 60 and includes an edge member 62 and a rib 64. As shown in FIG. 11, the edge member 62 has a rear edge 65 with a forwardly relieved portion 66 for receiving the rib member 64. Except for the shape of the relieved portion 66 the edge member 62 is similar to the edge member 16 of FIGS. 1 to 6 and need not be further described. Also, the rib 64 as shown best in FIG. 12 includes a spine portion 68 which is located rearwardly of the rear edge 65 of the edge member and which joins its two cheeks 70, 70. Except for the shape of the spine portion 68 the rib 64 is substantially identical with the rib 28 of FIG. 2 and need not further be described.

The relieved portion 66 of the edge member 62 and the spine portion 68 of the rib 64 are so formed as to provide a snap action fit between the two parts whereby the rib is normally held in fixed assembly with the edge member but may be moved into and out of assembly therewith by flexing or bending the edge member in the proper manner. More particularly, the relieved portion 66 of the edge member 62 includes at its upper end a generally rearwardly and downwardly extending shoulder 72 and at its lower end includes a rearwardly and upwardly extending shoulder 74. For cooperation with these shoulders 72, and 74 the spine portion 68 of the rib member has, at its upper end, a rearwardly and downwardly inclined shoulder 76 and has at its lower end a rearwardly and upwardly inclined shoulder 78. The spacing between the rib shoulders 76 and 78 is substantially equal to the spacing between the edge member shoulders 72 and 74 so that when the rib is in place relative to the edge member, as in FIG. 7, the coengagement between the various shoulders, and between the rib cheeks 70, 70 and side faces of the edge member hold the rib and edge member in assembly.

Since the edge member 62 is made of steel which is relatively flexible, it may be bent by hand to allow one set of coengaging shoulders 74, and 78 or 72 and 76 to be moved over one another to bring the rib into and out of assembly with the edge member. For example, in FIG. 13 the rib 64 is shown partially assembled with the edge member 62. In the illustrated position upper shoulder 76 of the rib member is in engagement with the upper shoulder 72 of the edge member with the lower shoulders 74 and 78 of the edge member and rib, respectively, are out of engagement. From the illustrated position the rib 64 may be moved forwardly relative to the edge member 62 to bring the lower shoulders 74 and 78 into interlocking engagement by bending the lower end of the edge member 62 to move its lower end forwardly or to the left in FIG. 13, thereby temporarily increasing the spacing between the shoulders 72 and 74 to allow the spine portion 68 of the rib to move into its assembled position relative to the edge member. The reverse procedure is used to remove the rib from assembly with the edge member.

Normally, the cutting forces imposed on the blade 60 are rearwardly directed so that the edge member 62 is pushed rearwardly against the rib 64 which in turn is pushed rearwardly against its holder, such as the holder 18 of FIG. 1. Therefore, the forces developed by the cutting process tend to hold the edge member in assembly with the rib and the rib in place in its groove in the holder.

Figure 14:
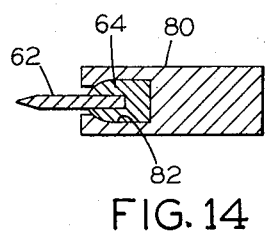
FIG. 14 is a transverse sectional view taken through the blade of FIG. 7 and an accompanying holder.

In some instances the rearwardly directed forces imposed on the lower end of the blade by the material being cut may tend to move the upper end of the blade forwardly relative to the holder. To overcome such forward movement of the blade the holder may, if desired, be made, as shown for example in FIG. 14, so as to capture the blade and restrain it against forward movement. In FIG. 14 the holder is illustrated at 80 and includes a groove 82 for receiving the rib 64 of the blade with the groove being shaped for receiving the rib 64 of the blade with the groove being shaped so as to partially wrap around the forward portion of the blade and restrain it against forward movement.

I claim:

1. A stiffened cutting blade for use in a cutting apparatus of the type employing an elongated cantilevered cutting blade reciprocated along its longitudinal axis, said cutting blade comprising an elongated edge member having two generally parallel side faces, a longitudinally extending rear edge, and a longitudinally extending front edge sharpened along at least a portion of its length, a stiffening rib extending along a portion of the length of said edge member, said stiffening rib having two side cheeks each engaging a respective one of said side faces of said edge member and each having a longitudinally extending front edge located a substantial distance rearwardly of said front edge of said edge member so that said edge member projects a substantial distance forwardly beyond said rib, and means releasably fixing said edge member to said rib to form them into a single unit, said rib being made of a material substantially stiffer than the material of said edge member and said edge member being made of a material substantially more sharpenable than the material of said rib, said rib including a longitudinally extending spine portion located rearwardly of said rear edge of said edge member and connecting said two cheeks to one another, and said edge member along its rear edge including a forwardly relieved portion which receives said spine, and said means for releasably fixing said edge member to said rib comprising a generally rearwardly and downwardly extending shoulder on said edge member defining the upper limit of said relieved portion and a generally rearwardly and upwardly extending shoulder defining the lower limit of said relieved portion, said spine having at its upper end a forwardly and upwardly extending shoulder and at its lower end a forwardly and downwardly extending shoulder, said shoulders of said spine being engageable with said shoulders of said edge member when said edge member is in its normal undeflected condition to hold said rib and edge member in assembly, and said edge member being bendable away from said normal undeflected condition to allow said shoulders to be moved into and out of engagement with one another to assemble and disassemble said rib and said edge member.

2. A stiffened cutting blade as defined in claim 1 further characterized by said edge member having an elongated rear edge which below said spine is aligned with said rear edge of said spine.

3. A stiffened cutting blade as defined in claim 1 further characterized by said edge member having an elongated rear edge which above said spine is aligned with said rear edge of said spine.

4. A stiffened cutting blade for use in a cutting apparatus of the type employing an elongated cantilevered cutting blade reciprocated along its longitudinal axis, said cutting blade comprising an elongated edge member having two generally parallel side faces, a longitudinally extending rear edge, and a longitudinally extending front edge sharpened along at least a portion of its length, said rear edge including a straight upper portion and a straight lower portion located along a common straight line and also including an intermediate portion between said upper and lower portions which intermediate portion is located forwardly of said common straight line, a stiffening rib extending along said intermediate portion of said rear edge of said edge member, said stiffening rib having a thickness, as measured perpendicular to said parallel side faces of said edge member, greater than that of said edge member and including two cheeks each engaging a respective one of said side faces and each having a longitudinally extending front edge located a substantial distance rearwardly of said front edge of said edge member so that said edge member projects a substantial distance forwardly beyond said rib, said rib also including a spine portion located rearwardly of said intermediate portion of said rear edge of said edge member and connected to said two cheek portions, said spine having a straight rear edge aligned with said upper and lower portions of said rear edge of said edge member, and means for releasably fixing said edge member to said rib to form them into a single unit, said rib being made of a material substantially stiffer than the material of said edge member and said edge member being made of a material substantially softer than the material of the rib and therefore more sharpenable than the material of said rib, said rib being adapted to be slidably mounted in a guide means in said cutting apparatus.

5. A stiffened cutting blade as defined in claim 4 further characterized by said cheeks of said rib extending downwardly beyond the lower end of said spine.

6. A stiffened blade as defined in claim 4 further characterized by said edge member being made of steel and said rib being made of tungsten carbide.

* * * * *